US012130679B2

(12) United States Patent
Hall (10) Patent No.: US 12,130,679 B2
(45) Date of Patent: Oct. 29, 2024

(54) POWER AND COMMUNICATION SYSTEMS FOR REMOTE COMPONENTS

(71) Applicant: Simmonds Precision Products, Inc., Vergennes, VT (US)

(72) Inventor: Robbie W. Hall, Charlotte, VT (US)

(73) Assignee: SIMMONDS PRECISION PRODUCTS, INC., Vergennes, VT (US)

( * ) Notice: Subject to any disclaimer, the term of this patent is extended or adjusted under 35 U.S.C. 154(b) by 196 days.

(21) Appl. No.: 17/485,031

(22) Filed: Sep. 24, 2021

(65) Prior Publication Data

US 2023/0096639 A1  Mar. 30, 2023

(51) Int. Cl.
*G06F 13/00* (2006.01)
*G06F 1/26* (2006.01)
*H04B 3/54* (2006.01)

(52) U.S. Cl.
CPC .............. *G06F 1/26* (2013.01); *H04B 3/548* (2013.01)

(58) Field of Classification Search
None
See application file for complete search history.

(56) References Cited

U.S. PATENT DOCUMENTS

| | | | |
|---|---|---|---|
| 5,063,371 A | 11/1991 | Oyer et al. | |
| 7,015,798 B2 | 3/2006 | Hair, III et al. | |
| 7,843,188 B2 | 11/2010 | Harres | |
| 8,015,273 B2 | 9/2011 | Le Peuvedic | |
| 8,787,848 B2 | 7/2014 | Kielb et al. | |
| 9,667,316 B2 | 5/2017 | Nguyen et al. | |
| 10,089,274 B2 | 10/2018 | Biskup | |
| 10,132,849 B1 | 11/2018 | Hall | |
| 2014/0265627 A1 | 9/2014 | Julicher | |
| 2015/0115809 A1* | 4/2015 | Siessegger | H05B 47/185 315/291 |
| 2020/0304172 A1* | 9/2020 | Yano | B60R 16/023 |
| 2021/0216125 A1 | 7/2021 | Hall | |
| 2021/0320519 A1* | 10/2021 | Chuang | G05F 1/56 |

OTHER PUBLICATIONS

Partial European Search Report, of the European Patent Office, mailed on Feb. 27, 2023, in corresponding European Patent Application No. 22197784.6.

* cited by examiner

*Primary Examiner* — Henry Tsai
*Assistant Examiner* — Dean Phan
(74) *Attorney, Agent, or Firm* — Kinney & Lange, P. A.

(57) ABSTRACT

A system (e.g., a power and communication system for remote components) can include a first wire, a second wire, and a first module operatively connected to the first and second wire. The first module can be configured to output power to and to communicate over the first wire and second wire. The system can include a second module operatively connected to the first module by the first wire and the second wire. The second module can be configured to receive power from the first module and to communicate with the first module over the first wire and/or second wire. The first module can be configured to modify a voltage on at least the first wire to signal to the second module to provide serial communication to the first module via the first wire and/or second wire.

12 Claims, 5 Drawing Sheets

POWER AND COMMUNICATION SYSTEMS FOR REMOTE COMPONENTS

FIELD

This disclosure relates to power and communication systems for remote components (e.g., for aircraft sensor systems).

BACKGROUND

Many avionics systems utilize computers that are located within the fuselage of the airplane. These computers interface with active sensors or remote data concentrators (RDCs) which can be located either internally or externally to the airplane fuselage. Two wire serial communications is typically used and additional wiring is required to power the active sensor or RDC, resulting in at least four wires per sensor. The aircraft power needs to be conditioned to correct for power bus variation. This typically requires a switched mode power supply to perform this conditioning. Multiple wires over long spans add weight to the airplane. Also, since the active sensors/data concentrators can reside in a flammable zone environment, the electronics are desired to be intrinsically safe when exposed to electromagnetic interference, lighting, and hot short threats. These issues drive line replaceable unit (LRU) cost, lower reliability, and add weight to the airplane.

Such conventional methods and systems have generally been considered satisfactory for their intended purpose. However, there is still a need in the art for improved power and communication systems. The present disclosure provides a solution for this need.

SUMMARY

A system (e.g., a power and communication system for remote components) can include a first wire, a second wire, and a first module operatively connected to the first and second wire. The first module can be configured to output power to and to communicate over the first wire and second wire. The system can include a second module operatively connected to the first module by the first wire and the second wire. The second module can be configured to receive power from the first module and to communicate with the first module over the first wire and/or second wire. The first module can be configured to modify a voltage on at least the first wire to signal to the second module to provide serial communication to the first module via the first wire and/or second wire.

In embodiments, the first module and the second module are configured to transmit data to each other using voltage modification encoding over the first and/or second wire. For example, the first module can be configured to modify a voltage signal to transmit a select signal configured to identify the second module to cause the second module to send back data via voltage modification encoding.

The first module can include a first voltage source in electrical communication with the first wire. In certain embodiments, the first module includes a second wire ground in electrical communication with the second wire.

In certain embodiments, the first module can include a select switch in communication between the first wire and a first wire ground such that the select switch is configured to pull the voltage low on the first wire when closed. In certain embodiments, the first module can include a first controller configured to control the select switch to open and close the select switch to pull down a first wire voltage on the first wire in a defined pattern that is configured to be read by the second module for causing the second module to transmit data to the first module.

In certain embodiments, the second module can include a select signal input assembly configured to receive the first wire voltage and to output a binary signal indicative of whether the first wire voltage is pulled low, and a second controller in operative communication with the select signal input assembly to receive the binary signal and to determine whether the binary signal indicates the select signal to determine whether to transmit data back to the first module.

In certain embodiments, the select signal can include one or more bit signal patterns that are recognized by the second controller as identifying the second module for transmitting data therefrom. The second controller can be configured to operate a data switch to pull down the voltage on the first line to transmit a data signal to the first module according to a transmit criteria after receiving the select signal.

In certain embodiments, a select signal pattern or frequency can be different than a data signal pattern or frequency such that other commonly connected modules cannot confuse the data signal with a respective select signal. For example, the system can include one or more additional modules connected to the first module via the first wire and the second wire (e.g., in parallel with the second module). Each respective module can have a unique select signal associated therewith to be transmitted by the first controller to all of the second and additional modules to output a data signal from the respective controller.

In certain embodiments, the first module can be an in-board computer of an aircraft, and the second module and additional modules can each be an out-board active sensor and/or remote data (RDC) (OBASR) concentrator of the aircraft. The modules can be any other suitable modules for any suitable function such that the first module connects to the second module and/or any other additional modules via two wires to provide both power and communication over only the two wires.

A method can include providing power from a first module to a second module using only a first wire and a second wire, and modifying a voltage on the first line to send a select signal to the second module to cause the second module to modify the voltage on the first line to send a data signal. Modifying a voltage on the first line can include pulling the voltage low one or more times to create the select signal. Modifying the voltage can include pulling the voltage low in a predetermined pattern uniquely associated with the second module from a plurality of additional modules.

An aircraft electrical system can include a system as disclosed herein, e.g., as described above. In certain embodiments, a non-transitory computer readable medium can include computer executable instructions configured to cause a computer to execute a method, the method being any suitable method disclosed herein, e.g., as described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
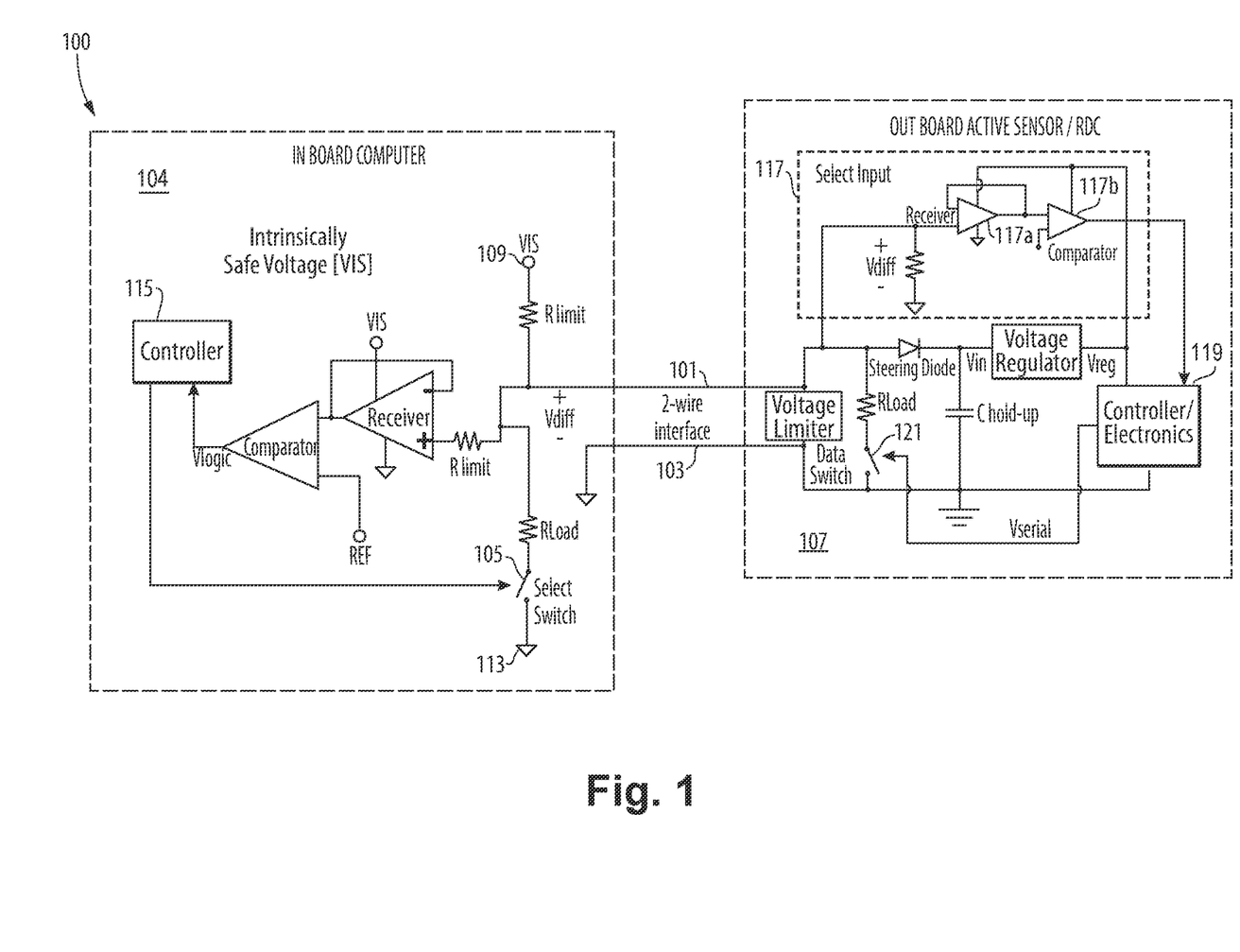
FIG. 1 is a schematic diagram of an embodiment of a system in accordance with this disclosure, shown having a first module and a second module.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-5.

Referring to FIG. 1, a system 100 (e.g., a power and communication system for remote components) can include a first wire 101, a second wire 103, and a first module 104 operatively connected to the first wire 101 and second wire 103 (e.g., to apply a voltage differential thereto). The first module 104 can be configured to output power to and to communicate over the first wire 101 and second wire 103.

The system 100 can include a second module 107 operatively connected to the first module 104 by the first wire 101 and the second wire 103 (e.g., such that the only electrical connection between the first module 104 and second module 107 is through the first wire 101 and the second wire 103, ether exclusively or eventually limited to the two wires 101, 103). The second module 107 can be configured to receive power from the first module 104 and to communicate with the first module 104 over the first wire 101 and/or second wire 103. The first module 104 can be configured to modify a voltage on at least the first wire 101 to signal to the second module 107 to provide serial communication to the first module 104 via the first wire 101 and/or second wire 103.

In embodiments, the first module 104 and the second module 107 can be configured to transmit data to each other using voltage modification encoding over the first and/or second wire 101, 103. For example, the first module 104 can be configured to modify a voltage signal to transmit a select signal configured to identify the second module 107 to cause the second module 107 to send back data via voltage modification encoding. For example, with additional reference to FIG. 2, an embodiment of a timing diagram of the system 100 is shown.

Figure 2:
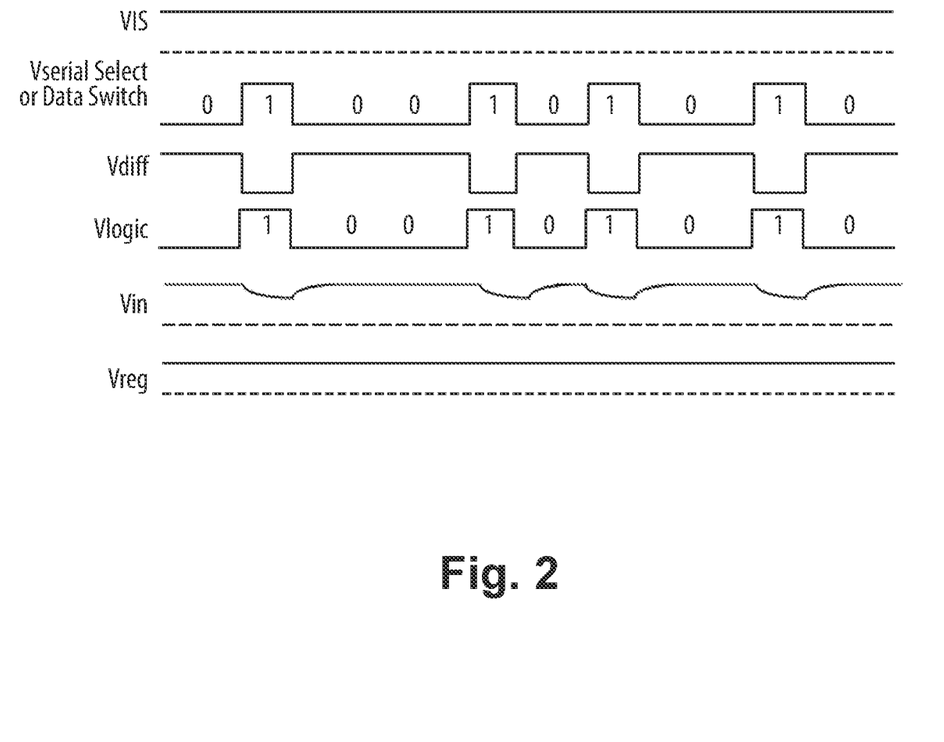
FIG. 2 is an embodiment of a timing diagram of the embodiment of FIG. 1 in accordance with this disclosure.

The first module 104 can include a first voltage source 109 (e.g., having intrinsically safe voltage VIS) in electrical communication with the first wire 101 (e.g., always on and constant as shown in FIG. 2). In certain embodiments, the first module 104 includes a second wire 103 ground in electrical communication with the second wire 103.

In certain embodiments, the first module 104 can include a select switch 105 in communication between the first wire 101 and a first wire ground 113 such that the select switch 105 is configured to pull the voltage low on the first wire 101 when closed (e.g., as shown in FIG. 2, when the select switch is controlled on, the different voltage $V_{diff}$ and the voltage $V_{in}$ to the second module 107 drops). In certain embodiments, the first module 104 can include a first controller 115 configured to control the select switch 105 to open and close the select switch 113 (e.g., via $V_{logic}$) to pull down a first wire voltage (and thus the differential voltage $V_{diff}$) on the first wire 101 in a defined pattern (e.g., as shown in FIG. 4 for the multi sensor system of FIG. 3). The defined pattern (e.g., a certain number of bits within a defined period of time and/or a certain timing of a plurality of bits within the defined period of time) can be configured to be read by the second module 107 for causing the second module 107 to transmit data to the first module 104.

For example, in certain embodiments, the second module 107 can include a select signal input assembly 117 configured to receive the first wire voltage and to output a binary signal (e.g., a digital signal such as a 1 or 0) indicative of whether the first wire voltage is pulled low (or otherwise modified in a predefined way), e.g., below a threshold. For example, the select signal input assembly 117 can include a receiver 117a and a comparator 117b arranged as shown in FIG. 1. The receiver 117a can be configured as a buffer to ensure signal quality, and the comparator 117b can determine if the signal from the receiver 117a qualifies as 1 or 0, for example (by comparing to a reference voltage).

The second module 107 can also include a second controller 119 in operative communication with the select signal input 117 assembly to receive the binary signal and to determine whether the binary signal indicates the select signal (associate with the second module 107) to determine whether to transmit data back to the first module 104. For example, the second controller 119 can have a unique stored ID that the second controller 119 can compare to the signal transmitted by the first controller 115 of the first module 104.

Figure 3:
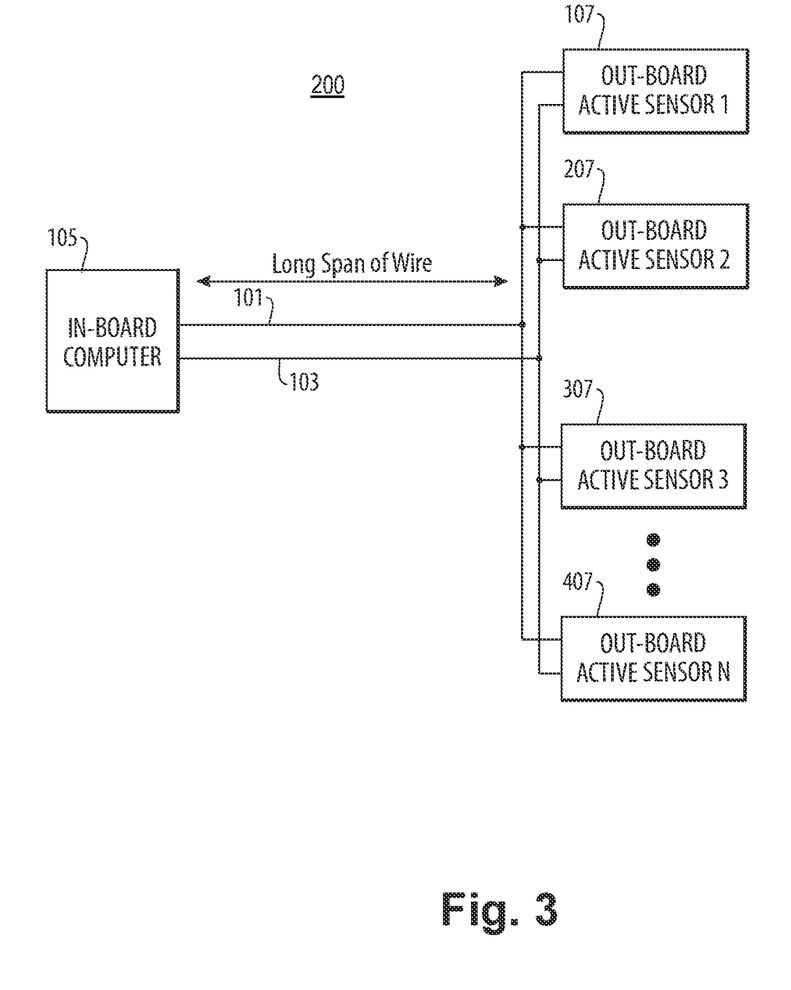
FIG. 3 is a schematic diagram of an embodiment of a system in accordance with this disclosure, shown having additional modules connected to the first module.
Figure 4:
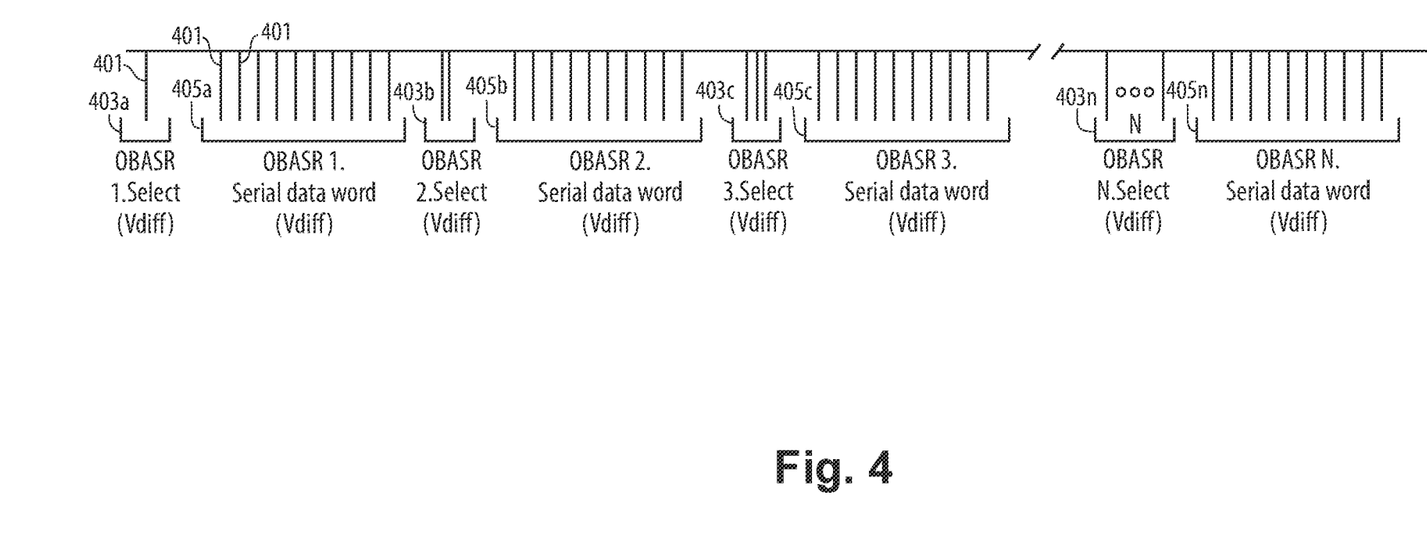
FIG. 4 is an embodiment of a serial communication timeline for the embodiment of FIG. 2 in accordance with this disclosure.

As shown in FIG. 3, a system 200 can include the system 100 and can have any suitable number of additional modules 207, 307, 407 (e.g., sensors 1-N) ultimately connected via only the two wires 101, 103. Each additional module can be the same as or similar to the second module 107. As shown, all modules can be connected in parallel to each other and to the first and second wires 101, 103. Any other suitable features or modules are contemplated herein.

Referring additionally to FIG. 4, in certain embodiments, the select signal 403a, b, c, n can include one or more bit signal patterns that are recognized by the second controller 119 as identifying the second module 107 for transmitting data therefrom. The second controller 119 can be configured to operate a data switch 121 to pull down the first line voltage (by creating a pathway to ground as shown) on the first line 101 to transmit a data signal to the first module 104 according to a transmit criteria (e.g., a time delay) after receiving the select signal (that identifies the second module 107). In this regard, the second controller 119 can send signals to the first controller 115 in the same manner as the select signal but in reverse to allow the second controller 119 to send data to the first module 104.

FIG. 4 shows serial signals sent in accordance with an embodiment of this disclosure. For example, each bit 401 can represent a single voltage pull down (e.g., caused by closing of the select switch 105 for the select signals 403a, b, c, n or the data switch 121 for the data signals 405a, b, c, n). Each module 107, 207, 307, 407 connected to the first module 104 can have a unique select signal (e.g., a different number of bits occurring within a defined time). For example, the first module 104 can output a select signal 403a having a single bit and all the modules can see this select signal. In certain embodiments, only the second module 107 can see the single bit within the defined time and be configured to then output a data signal 405a comprising a plurality of bits. The number of bits in each select signal can be used to select amongst a plurality of the modules, e.g., as shown by select signals 403b, c, n and data signals 405b, c, n. The select signals can be all low pull codes, or any other suitable code (e.g., a binary code such as 1010, 0, 00, 000, 1011, or 0001, or any other suitable code) within period of time Also, as shown in FIG. 4, in certain embodiments, a select signal pattern and/or frequency can be different than a data signal pattern or frequency such that other commonly connected modules cannot confuse the data signal with a respective select signal. For example, the select signals 403b, c, n are shown having a smaller spacing between bits than each respective data signal. This can allow each controller to differentiate between select signals and data from another module when transmitting back to the first module 104. Any other suitable differentiating characteristics between select signals, data signals, or both, are contemplated herein.

Accordingly, the system 100, 200 can include one or more additional modules 207, 307, 407 connected to the first module 104 via the first wire 101 and the second wire 103 (e.g., in parallel with the second module 107). Each respective module can have a unique select signal associated therewith to be transmitted by the first controller 105 to all of the second and additional modules 107, 207, 307, 407 to output a data signal from the respective controller. The two wires 101, 103 can be long wires that connect the first module 104 to remote modules (which can be grouped physically close together).

In certain embodiments, as shown, the first module 104 can be an in-board computer of an aircraft, and the second module 107 and additional modules 207, 307, 407 can each be an out-board active sensor and/or remote data (RDC) (OBASR) concentrator of the aircraft. The modules can be any other suitable modules for any suitable function such that the first module connects to the second module and/or any other additional modules via two wires to provide both power and communication over only the two wires.

A method can include providing power from a first module to a second module using only a first wire and a second wire, and modifying a voltage on the first line to send a select signal to the second module to cause the second module to modify the voltage on the first line to send a data signal. Modifying a voltage on the first line can include pulling the voltage low one or more times to create the select signal. Modifying the voltage can include pulling the voltage low in a predetermined pattern (e.g., as disclosed above) uniquely associated with the second module from a plurality of additional modules. The method can include any other suitable method(s) and/or portion(s) thereof.

An aircraft electrical system can include a system as disclosed herein, e.g., as described above. In certain embodiments, a non-transitory computer readable medium can include computer executable instructions configured to cause a computer to execute a method, the method being any suitable method disclosed herein, e.g., as described above.

Embodiments can include a low cost, low weight, intrinsically safe two wire power and bi-directional serial communication scheme. Embodiments allow bi-directional communication to occur between the in-board computer and the out board active sensor (OBASR)/remote data concentrator (RDC). This provides the ability to power and communicate between the in-board computer to multiple outboard devices using a single set of two wires.

Usually, two wires for power and two for communication are needed for each connection, totaling four wires each. Embodiments, however, can group (e.g., all sensors on a fuel tank) and have long wires back to the inboard computer that are only the two wires. Embodiments can have far less total wire length (and weight) than traditional systems.

Embodiments can utilize the principles of design of the embodiments disclosed in U.S. patent application Ser. No. 16/738,884, filed Jan. 9, 2020, incorporated herein by reference in its entirety. Embodiments disclosed herein allow multiple OBASR's to communicate and power from a single pair of wires. FIG. 3 depicts the effect of this change at a system level, showing a significant reduction in wire over traditional systems (where each sensor has four wires running from each sensor to the inboard computer as opposed to just two wires to all sensors as shown).

In accordance with certain embodiments, an inboard computer can interface to an outboard active sensor/RDC (OBASR) via two wires. These wires can be composed of a twisted pair or a twisted shielded pair depending on the EMIC environment present, for example. Power can be provided by the in-board computer to the OBASR via an intrinsically safe voltage source VIS. This voltage can bias an input resistor network of the in-board computer's differential receiver. The resistor network can include four resistors (Rlimit) and can limit the current passed to each OBASR. Each OBASR can receive the voltage Vin whereby it forward biases the steering diode powering each OBASR's voltage regulator while also charging its hold up capacitor (C hold-up). The output voltage of the regulator Vreg can power each OBASR's controller, for example.

Embodiments can include a two wire bidirectional communication Scheme and can have intrinsic safety. For example, the C hold-up capacitor can be sized to limit the energy storage capacity preventing spark ignition in a flammable zone. The maximum voltage developed across the capacitor can be controlled by the voltage limiter as shown. This feature can be useful when EMIC, lightning, and hot short threats are present on the interface wiring. To mitigate high conduction currents from occurring with these threats, current limiters can be used for each signal line. A plurality of voltage and current limiters may be used to ensure the design is fault tolerant from an intrinsic safety standpoint.

To communicate, the system can use the same two wires used to power the active sensor to transmit data to and from the in-board computer and each OBASR. To initiate communication, the in-board computer can select the OBASR it would like to receive data from by sending a series of negative going pulses out on the two wire bus. This can be achieved by the select switch pulling down the voltage on the pull up resistor biased by the, e.g., +5 VIS power in the in-board computer.

The select switch can be controlled by the in-board computer's controller such that it creates a unique series of ID bits that are received by all the OBASRs. Each OBASR's controller receives and data via it's transmit select input signal. Each OBASR has its own unique pre-programmed ID so when the ID bits transmitted on the two wire bus matches its respective ID, it is then enabled to communicate sensor data back to the in board computer.

Embodiments provide serial data communication. For example, the OBASR generates the serial data via the control signal Vserial that activates a switch which pulls down the voltage feed from the in-board computer generating a serial voltage Vdiff. The C hold-up capacitor and R load can be sized to maintain Vin above the drop out voltage of the voltage regulator while also generating a large enough Vdiff voltage drop that can be detected by the in-board computer's receiver. It is contemplated that the receiver can be configured to be single ended or differential depending on the need for common mode rejection. FIG. 1 depicts the receiver in a single mode configuration, for example. The receiver's output can be conditioned by a comparator generating a logic output signal Vlogic that inputs to the in-board computer's controller. FIG. 4 provides an example of a serial data stream on the two-wire interface showing both the OBASR selection and serial data stream bit sequence.

Figure 5:
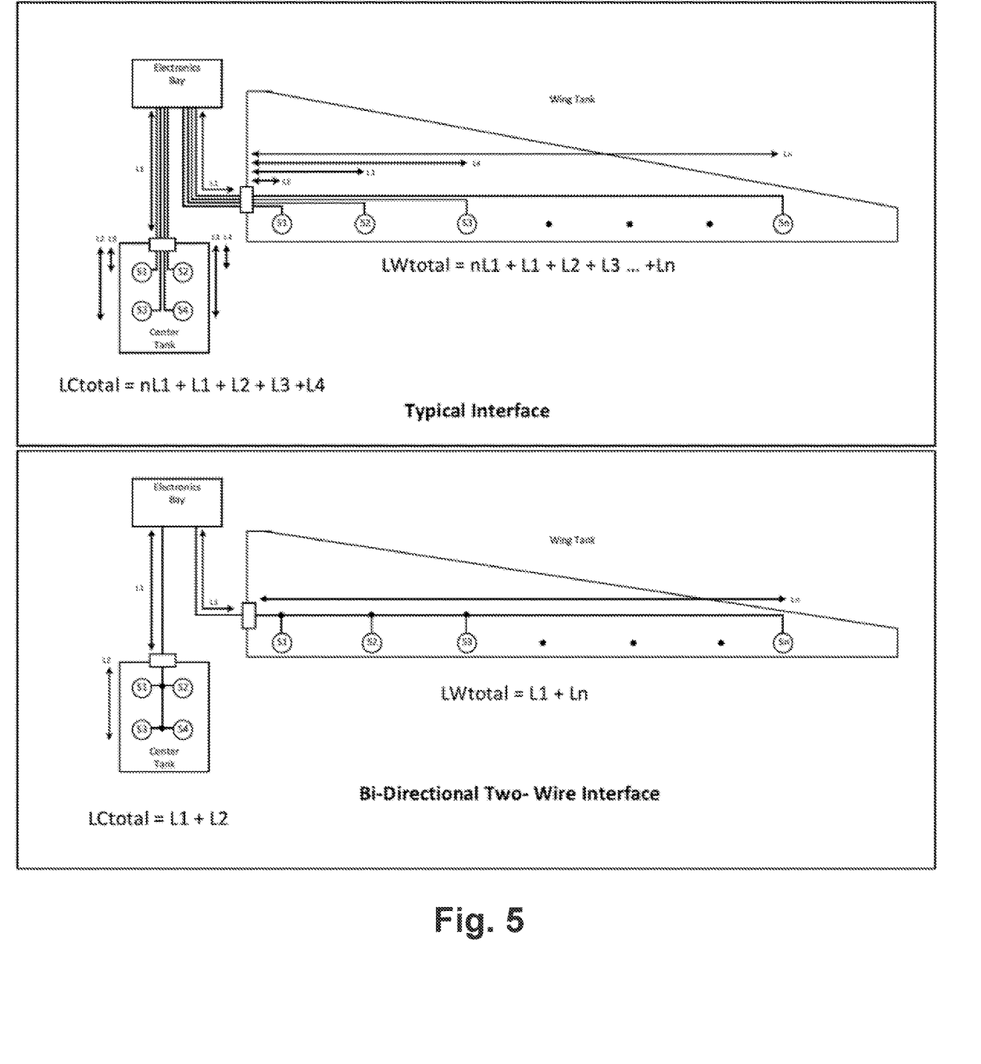
FIG. 5 is a comparison of a traditional system to an embodiment of a system in accordance with this disclosure.

FIG. 5 shows an embodiment of a sensor system in accordance with this disclosure applied to a wing tank of an aircraft (bottom of FIG. 5) compared to a traditional system (shown top of FIG. 5). FIG. 5 shows a reduction of wire weights (LC total and LW total) using embodiments of this disclosure. Any other suitable application is contemplated herein.

Advantages to embodiments include that only two wires may be required for both power and serial communication resulting in lower wire weight, multiple OSABRs can be utilized on a single pair of wires, the interface can be simple driving low cost and high reliability, and that since the power is provided to the outboard electronics in a controlled fashion, a complex switched mode power supply is not required. Embodiments of an interface also facilitate current and energy limiting supporting intrinsic safety requirements.

Any module and/computer disclosed herein can include any suitable electrical hardware and/or software module(s) configured to perform the associated function. Any suitable functions, e.g., as disclosed above or otherwise, are contemplated herein.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system, comprising:
   a first wire;
   a second wire; and
   a first module operatively connected to the first and second wire, the first module configured to output power to and to communicate over the first wire and second wire;
   a second module operatively connected to the first module by the first wire and the second wire, the second module configured to receive power from the first module and to communicate with the first module over the first wire and/or second wire, wherein the first module is configured to modify a voltage on at least the first wire to signal to the second module to provide serial communication to the first module via the first wire and/or second wire,
   wherein the first module and the second module are configured to transmit data to each other using voltage modification encoding over the first and/or second wire, wherein the first module is configured to modify a voltage signal to transmit a select signal configured to identify the second module to cause the second module to send back data via voltage modification encoding, wherein the first module includes a first voltage source in electrical communication with the first wire, wherein the first module includes a select switch in communication between the first wire and a first wire ground such that the select switch is configured to pull the voltage low on the first wire when closed.

2. The system of claim 1, wherein the first module includes a second wire ground in electrical communication with the second wire.

3. The system of claim 1, further comprising a first controller configured to control the select switch to open and close the select switch to pull down a first wire voltage on the first wire in a defined pattern that is configured to be read by the second module for causing the second module to transmit data to the first module.

4. The system of claim 3, wherein the second module includes:
   a select signal input assembly configured to receive the first wire voltage and to output a binary signal indicative of whether the first wire voltage is pulled low; and
   a second controller in operative communication with the select signal input assembly to receive the binary signal and to determine whether the binary signal indicates the select signal to determine whether to transmit data back to the first module.

5. The system of claim 4, wherein the select signal includes one or more bit signal patterns that are recognized by the second controller as identifying the second module for transmitting data therefrom.

6. The system of claim 5, wherein the second controller is configured to operate a data switch to pull down the voltage on the first line to transmit a data signal to the first module according to a transmit criteria after receiving the select signal.

7. The system of claim 6, wherein a select signal pattern or frequency is different than a data signal pattern or frequency such that other commonly connected modules cannot confuse the data signal with a respective select signal.

8. The system of claim 7, further comprising one or more additional modules connected to the first module via the first wire and the second wire, wherein each respective module has a unique select signal associated therewith to be transmitted by the first controller to all of the second and additional modules to output a data signal from the respective controller.

9. The system of claim 7, wherein the first module is an in-board computer of an aircraft, and the second module and additional modules are each an out-board active sensor and/or remote data (RDC) (OBASR) concentrator of the aircraft.

10. A method of providing power from a first module to a second module using a first wire and a second wire, the first module being operatively connected to the first and second wire and being configured to output power to and to communicate over the first wire and the second wire, and the second module being operatively connected to the first module by the first wire and the second wire and being configured to receive power from the first module and to communicate with the first module over the first wire and/or second wire, wherein the first module is configured to modify a voltage on at least the first wire to signal to the second module to provide serial communication to the first module via the first wire and/or second wire, the method comprising:

providing power from the first module to the second module using only the first wire and the second wire; and modifying a voltage on the first wire to send a select signal to the second module to cause the second module to modify the voltage on the first wire to send a data signal via voltage modification encoding, wherein the first module includes a select switch in communication between the first wire and a first ground such that the select switch is configured to pull the voltage low on the first wire when closed, wherein modifying the voltage on the first wire includes pulling the voltage low one or more times to create the select signal.

11. The method of claim 10, wherein modifying the voltage includes pulling the voltage low in a predetermined pattern uniquely associated with the second module from a plurality of additional modules.

12. An aircraft electrical system, comprising:
a first wire;
a second wire; and
a first module operatively connected to the first and second wire, the first module configured to output power to and to communicate over the first wire and second wire;
a second module operatively connected to the first module by the first wire and the second wire, the second module configured to receive power from the first module and to communicate with the first module over the first wire and/or second wire, wherein the first module is configured to modify a voltage on at least the first wire to signal to the second module to provide serial communication to the first module via the first wire and/or second wire,
wherein the first module and the second module are configured to transmit data to each other using voltage modification encoding over the first and/or second wire, wherein the first module is configured to modify a voltage signal to transmit a select signal configured to identify the second module to cause the second module to send back data via voltage modification encoding, wherein the first module includes a first voltage source in electrical communication with the first wire, wherein the first module includes a select switch in communication between the first wire and a first wire ground such that the select switch is configured to pull the voltage low on the first wire when closed.

* * * * *